(12) United States Patent
Yu

(10) Patent No.: US 11,965,563 B2
(45) Date of Patent: Apr. 23, 2024

(54) ELASTIC SHORT-PIN TYPE UNIVERSAL JOINT

(71) Applicant: RE-DAI PRECISION TOOLS CO., LTD., Taichung (TW)

(72) Inventor: Hsiang Chen Yu, Taichung (TW)

(73) Assignee: RE-DAI PRECISION TOOLS CO., LTD., Taichung (TW)

(*) Notice: Subject to any disclaimer, the term of this patent is extended or adjusted under 35 U.S.C. 154(b) by 608 days.

(21) Appl. No.: 17/166,061

(22) Filed: Feb. 3, 2021

(65) Prior Publication Data

US 2021/0156434 A1 May 27, 2021

Related U.S. Application Data

(63) Continuation-in-part of application No. 15/928,131, filed on Mar. 22, 2018, now Pat. No. 11,098,765, which is a continuation-in-part of application No. 14/554,138, filed on Nov. 26, 2014, now abandoned.

(30) Foreign Application Priority Data

Aug. 22, 2014 (TW) ................. 103129050

(51) Int. Cl.
*F16D 3/205* (2006.01)
*F16D 3/40* (2006.01)

(52) U.S. Cl.
CPC .............. *F16D 3/2057* (2013.01); *F16D 3/40* (2013.01)

(58) Field of Classification Search
CPC . F16D 3/0257; F16D 3/26; F16D 3/28; F16D 3/38; F16D 3/382; F16D 3/40; F16D 3/50; F16D 3/2057; B25B 23/0014; B25B 23/0028; Y10T 403/32041
USPC .................. 81/177.75; 403/57; 464/121, 136
See application file for complete search history.

(56) References Cited

U.S. PATENT DOCUMENTS

| 719,411 | A | 1/1903 | Bocorselski |
| 927,087 | A | 7/1909 | Vanderbeek |
| 1,167,455 | A | 1/1916 | Watts |
| 1,364,842 | A | 1/1921 | Mackey |
| 1,371,750 | A | 3/1921 | Fox |

(Continued)

FOREIGN PATENT DOCUMENTS

| CN | 201068937 Y | 6/2008 |
| CN | 201425063 Y | 3/2010 |

(Continued)

*Primary Examiner* — Amber R Anderson
*Assistant Examiner* — Kevin J Baynes
(74) *Attorney, Agent, or Firm* — Muncy, Geissler, Olds & Lowe, P.C.

(57) ABSTRACT

An elastic short-pin type universal joint includes a first base, a second base, a jointer, a first elastic member, two second elastic members, and four short pins. The first base engages the second base to form a space therebetween. The jointer is received in the space between the first and the second bases. The jointer has a first bore passing through the jointer, a second bore, and a third bore. The first elastic member is received in the first bore of the jointer, and the second elastic members are received in the second bore and the third bore. The short pins are urged by ends of the first elastic member and the second elastic members to press the first base and the second base respectively. As a result, the first base is able to rotate related to the second base in all directions.

4 Claims, 6 Drawing Sheets

(56) References Cited

U.S. PATENT DOCUMENTS

| | | | |
|---|---|---|---|
| 1,582,997 A | 5/1926 | McGee | |
| 1,602,997 A | 10/1926 | Beckwith | |
| 1,887,106 A | 11/1932 | Shierk | |
| 1,897,945 A | 2/1933 | Dooley | |
| 1,942,746 A | 1/1934 | Degener | |
| 1,978,590 A | 10/1934 | Norris et al. | |
| 2,196,297 A | 4/1940 | Gagne | |
| 2,354,961 A | 8/1944 | O'Donnell | |
| 2,526,105 A | 10/1950 | Adams | |
| 2,648,207 A | 8/1953 | Quinn | |
| 2,696,124 A | 12/1954 | Flowers et al. | |
| 2,800,777 A | 7/1957 | Baker et al. | |
| 2,844,949 A | 7/1958 | Stillwagon, Jr. | |
| 2,873,591 A | 2/1959 | Stillwagon, Jr. | |
| 2,881,602 A | 4/1959 | Baker et al. | |
| 2,926,510 A | 3/1960 | De Lorean | |
| 2,947,158 A | 8/1960 | King | |
| 3,022,649 A | 2/1962 | Roller | |
| 3,213,644 A | 10/1965 | Murphy | |
| 3,310,959 A | 3/1967 | Sheppard | |
| 3,750,424 A | 8/1973 | Nettleton | |
| 3,930,378 A | 1/1976 | Schmid | |
| 4,365,488 A | 12/1982 | Mochida et al. | |
| 4,786,271 A | 11/1988 | Menn | |
| 5,040,652 A * | 8/1991 | Fish | E05C 1/163 70/472 |
| 5,062,730 A * | 11/1991 | Tomii | F16D 3/40 403/57 |
| 5,326,322 A | 7/1994 | Fechter | |
| 5,421,780 A | 6/1995 | Vukovic | |
| 5,505,661 A | 4/1996 | Habicht | |
| 5,660,491 A | 8/1997 | Roberts et al. | |
| 5,728,004 A | 3/1998 | Dziegielewski | |
| 6,162,126 A | 12/2000 | Barrett et al. | |
| 6,383,081 B1 | 5/2002 | DeBisschop | |
| 6,656,053 B2 | 12/2003 | Chang | |
| 6,843,579 B2 | 1/2005 | Chen | |
| 6,874,392 B1 | 4/2005 | Wu | |
| 6,881,151 B1 | 4/2005 | Jantz et al. | |
| 6,976,922 B2 | 12/2005 | Smith | |
| 7,140,969 B2 * | 11/2006 | Prucher | F16D 3/387 464/902 |
| 7,320,644 B2 | 1/2008 | Wehner | |
| 7,445,556 B2 | 11/2008 | Wehner | |
| 7,604,544 B2 | 10/2009 | Wehner | |
| 7,827,670 B2 | 11/2010 | Wehner | |
| 8,047,103 B2 | 11/2011 | Davidson et al. | |
| 8,151,671 B2 * | 4/2012 | Chen | B25B 23/0014 464/119 |
| 8,328,648 B2 | 12/2012 | Molinar et al. | |
| 8,500,565 B2 | 8/2013 | Billman et al. | |
| 8,550,925 B2 * | 10/2013 | Liu | F16D 3/38 464/904 |
| 8,562,448 B2 | 10/2013 | Song | |
| 8,657,694 B2 | 2/2014 | Horwath et al. | |
| 8,746,113 B2 | 6/2014 | Davidson et al. | |
| 2002/0151368 A1 | 10/2002 | Chang | |
| 2004/0212989 A1 | 10/2004 | Chen | |
| 2005/0022748 A1 | 2/2005 | Gabriel et al. | |
| 2008/0081703 A1 | 4/2008 | Wehner | |
| 2008/0108446 A1 | 5/2008 | Faude | |
| 2009/0023504 A1 | 1/2009 | Hu | |
| 2009/0036222 A1 | 2/2009 | Hu | |
| 2009/0041535 A1 | 2/2009 | Hu | |
| 2012/0036969 A1 | 2/2012 | Davidson et al. | |

FOREIGN PATENT DOCUMENTS

| | | | |
|---|---|---|---|
| DE | 0160319 A2 * | 11/1985 | F16D 3/40 |
| GB | 1127196 A | 9/1968 | |
| JP | H09317785 A | 12/1997 | |
| TW | 244918 | 4/1995 | |
| TW | M252833 U | 12/2004 | |
| TW | M282072 U | 12/2005 | |
| TW | M431975 U | 6/2012 | |

\* cited by examiner

US 11,965,563 B2

ELASTIC SHORT-PIN TYPE UNIVERSAL JOINT

CROSS-REFERENCE

The present application is a continuation-in-part application of U.S. patent application Ser. No. 15/928,131, filed on Mar. 22, 2018, which is a continuation-in-part application of U.S. patent application Ser. No. 14/554,138, filed on Nov. 26, 2014, now abandoned, which claims priority of Taiwan patent application Ser. No. 103129050, filed on Aug. 22, 2014, of which the entire disclosure is incorporated herein by reference for all purposes.

FIELD OF THE INVENTION

The invention relates to the technical field of a universal joint, and more particularly to an elastic short-pin type universal joint structure using four elastic short pins connected to a first base, a second base and a connection member.

BACKGROUND

A typical universal joint comprises a first base (male base), a second base (female base), and a connection member disposed between the first base and the second base. More particularly, one long pin penetrates through the first base and the connection member, and the other long pin penetrates through the second base and the connection member.

Because two long pins are inserted into the connection member at different levels and the insertion directions of the two long pins are perpendicular to each other, the connection member has two through holes at different levels to be penetrated by the two long pins. For example, each of U.S. Pat. Nos. 8,746,113; 6,843,579; and 5,660,491 discloses the combination structure of the connection member and the two long pins.

The other relative prior arts include U.S. Pat. Nos. 1,897,945, 1,887,106, 1,602997, and 4,786,271.

BRIEF SUMMARY

In view of the above, the primary objective of the present invention is to provide an elastic short-pin type universal joint capable of reducing the overall size or length.

The secondary objective of the present invention is to provide an elastic short-pin type universal joint capable of making the overall assembling processes become simpler and more rapid.

The third objective of the present invention is to provide an elastic short-pin type universal joint capable of maintaining the inclined angle between the first base and the second base.

In order to achieve the objective of the present invention, an elastic short-pin type universal joint includes a first base, a second base, a jointer, a first elastic member, two second elastic members, and four short pins. The first base has two first lugs, and the second base has two second lugs. The first base engages the second base with the first lugs between the second lugs. The jointer is received in a space within the first lugs and the second lugs. The jointer has a first bore passing through the jointer, a second bore, and a third bore. The first elastic member is received in the first bore of the jointer, and the second elastic members are received in the second bore and the third bore. The short pins are urged by ends of the first elastic member and the second elastic members to press the first lugs and the second lugs respectively.

In an embodiment, the second bore and the third bore are communicated with the first bore. The second elastic members abut against the first elastic member.

In an embodiment, the first elastic member has a foundation portion, which is a portion of the first elastic member harder than the other portion. The second elastic members abut against the foundation portion of the first elastic member.

DESCRIPTION OF THE DRAWINGS

The present invention will be best understood by referring to the following detailed description of some illustrative embodiments in conjunction with the accompanying drawings, in which.

DETAILED DESCRIPTION

Figure 1:
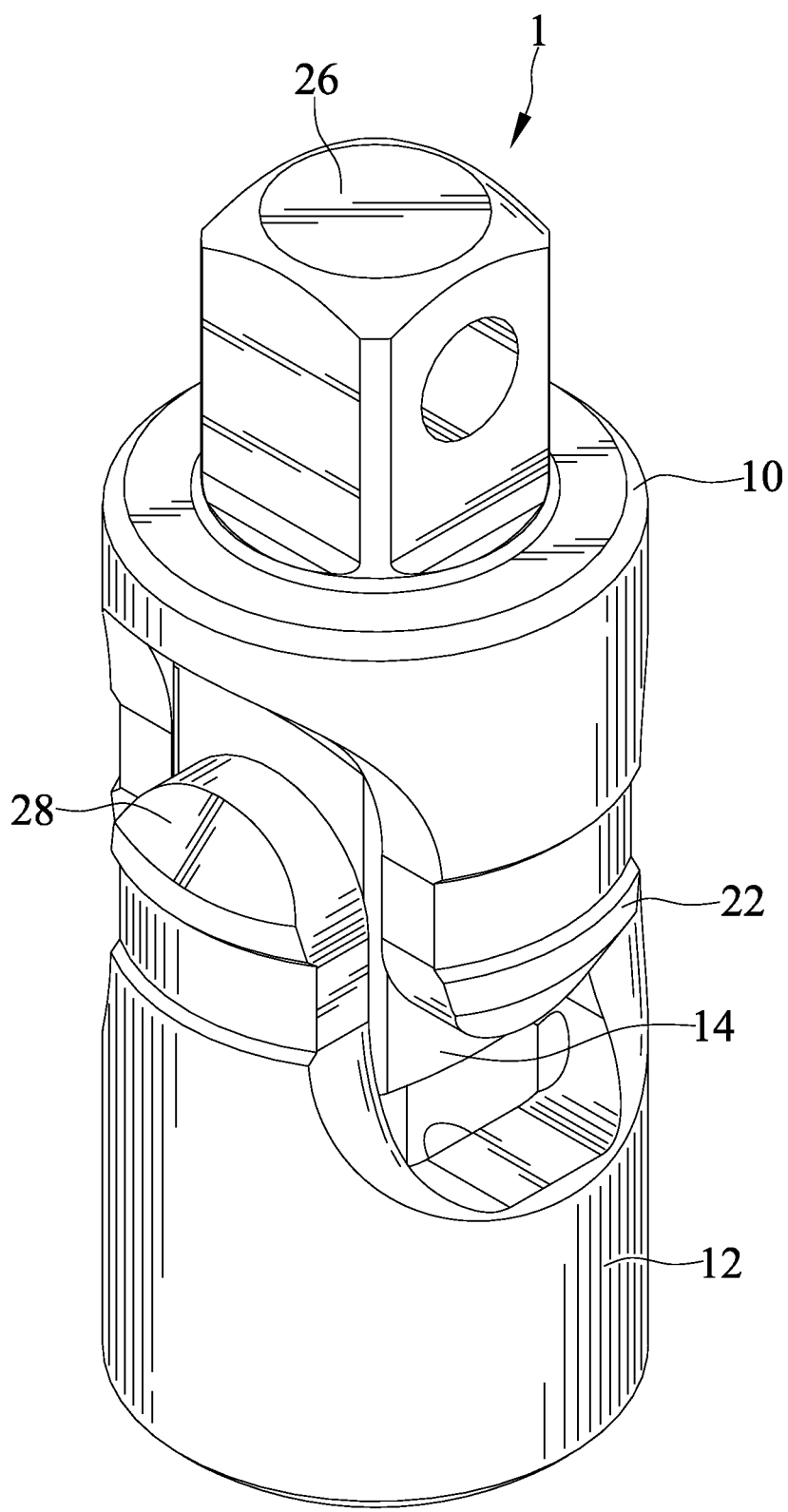
FIG. 1 is a perspective view of a preferred embodiment of the present invention.
Figure 2:
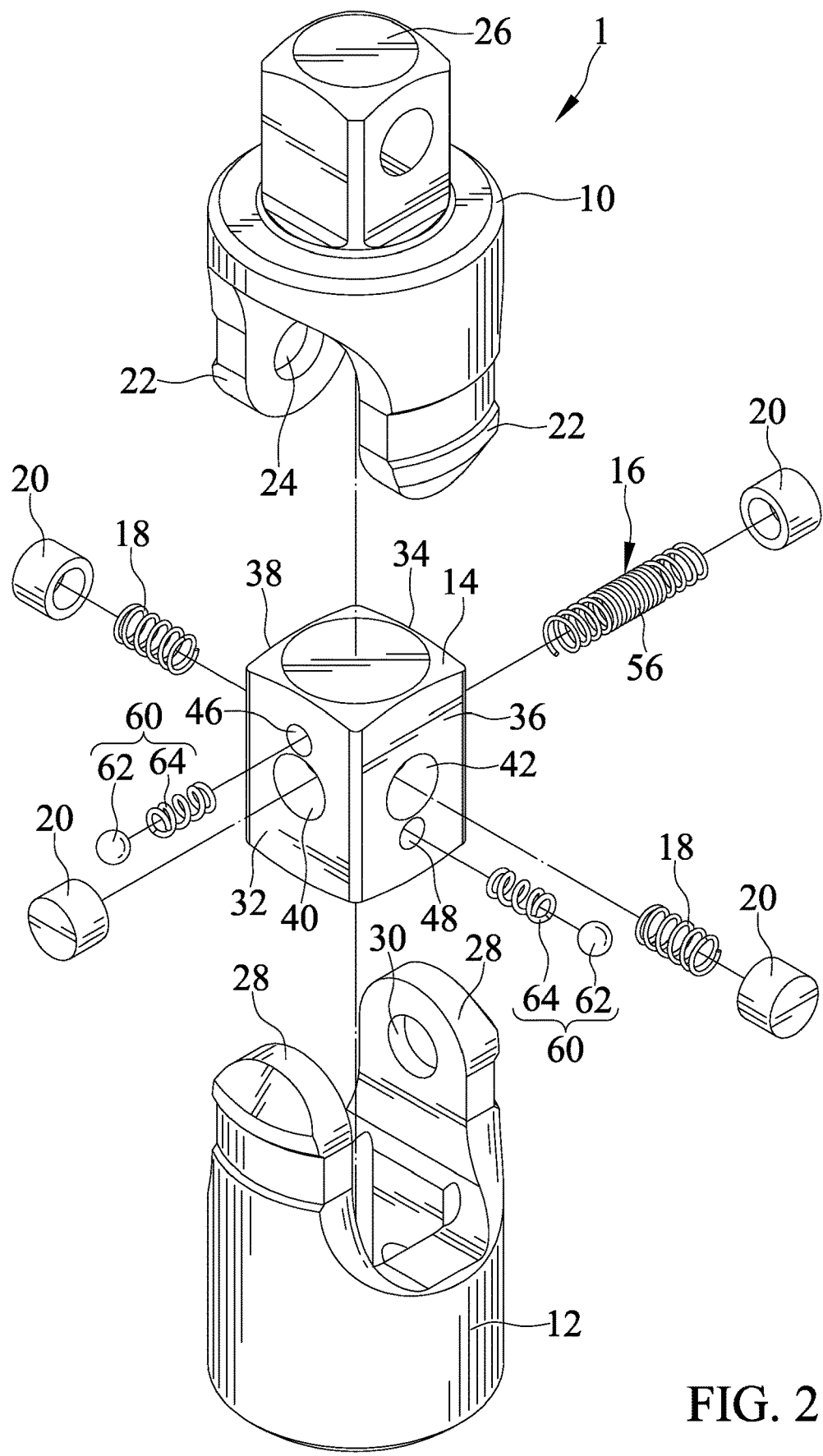
FIGS. 2 and 3 are exploded views of the preferred embodiment of the present invention.
Figure 3:
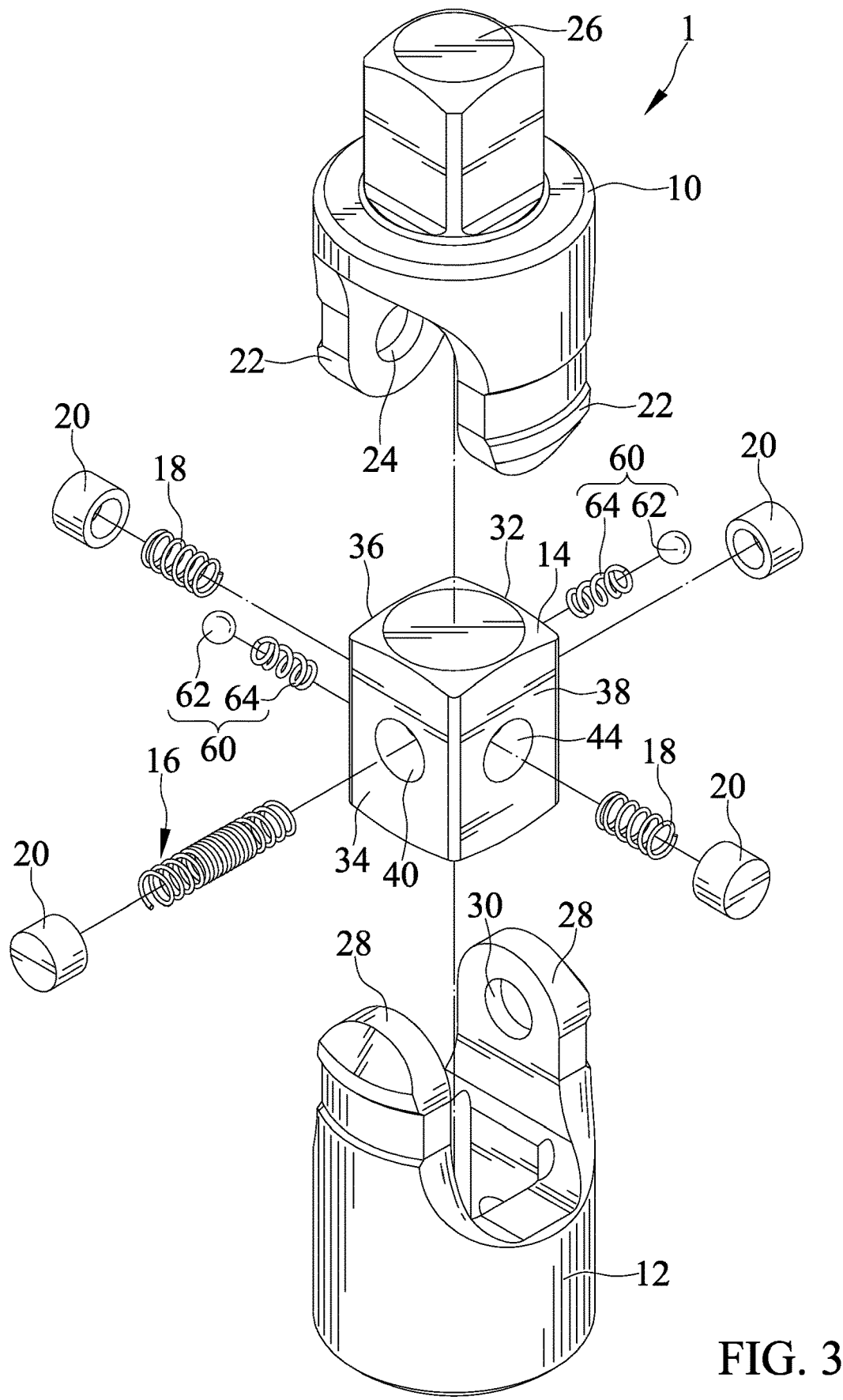

FIGS. 1-6 show an elastic short-pin type universal joint 1 of the first preferred embodiment of the present invention, including a first base 10, a second base 12, a jointer 14, a first elastic member 16, two second elastic members 18, four short pins 20, and two positioning units 60.

The first base 10 has two first lugs 22. The first luges 22 are parallel to and kept a predetermined distance from each other. The first lugs 22 each have a recess 24 on interior sides thereof. The first base 10 further has a driving portion 26, which is a socket adapter in the present preferred embodiment, at an end opposite to the first lugs 22.

The same as the first base 10, the second base 12 has two second lugs 28. The second lugs 28 are parallel and kept a predetermined distance from each other. The second lugs 28 each have a recess 30 on interior sides thereof.

In the preferred embodiment, each recess 24 of each first lug 22 does not penetrate through an exterior side of each first lug 22, and each recess 30 of each second lug 28 does not penetrate through an exterior side of each second lug 28. Thus, the exterior sides of first lugs 22 and second lug 28 can be intact and smooth and maintain the structural strength.

The jointer 14 is a cub-like member, having a first side 32, a second side 34, a third side 36, and a fourth side 38, wherein the second side 34 is opposite to the first side 32, the third side 36 is next to the first side 32, and the fourth side 38 is opposite to the third side 36. The jointer 14 is provided with a first bore 40, a second bore 42, a third bore 44, a fourth bore 46, and a fifth bore 48. The first bore 40 passes through the jointer 14, and is opened at the first side 32 and the second side 34. The second bore 42 and the third bore 44 are at opposite sides of the first bore 40 while the second bore 42 is opened at the third side 36 and the third bore 44 is opened at the fourth side 38, and both of them are communicated with the first bore 40. The fourth bore 46 is opened at the first side 32 and extends parallel to the first tbore 40. The fifth bore 48 is opened at the third side 36 and extends parallel to the second bore 42.

Figure 4:
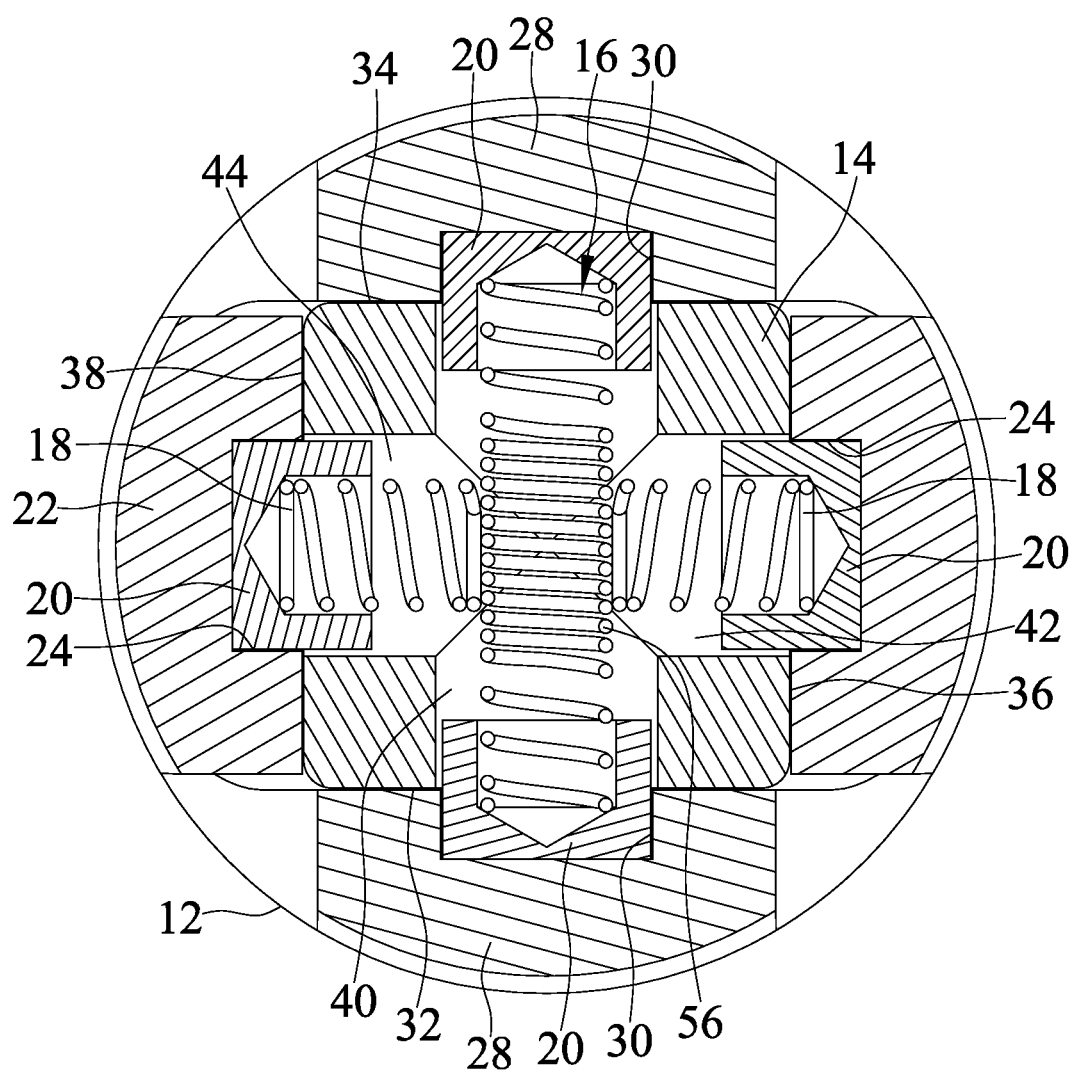
FIG. 4 is a sectional view of the preferred embodiment of the present invention, and illustrates second elastic members abut against a foundation portion of a first elastic member.

The first elastic member 16 is a compression spiral springs in the present embodiment, which is received in the first bore 40 of the jointer 14. Further, the first elastic member 16 has a foundation portion 56 at a middle portion thereof. A number of loops per unit length of the foundation portion 56 (or a density of the foundation portion 56) is greater than that of the other portions of the first elastic member 16, so that the foundation portion 56 is not easy to be deformed when it is exerted by an external force. The second elastic members 18 are compression spiral springs as well and are shorter than the first elastic member 16. The second elastic members 18 are put in the second bore 42 and the third bore 44 of the jointer 14, respectively, and have interior ends abutting against the foundation portion 56 of the first elastic member 16 (as shown in FIG. 4).

Figure 5:
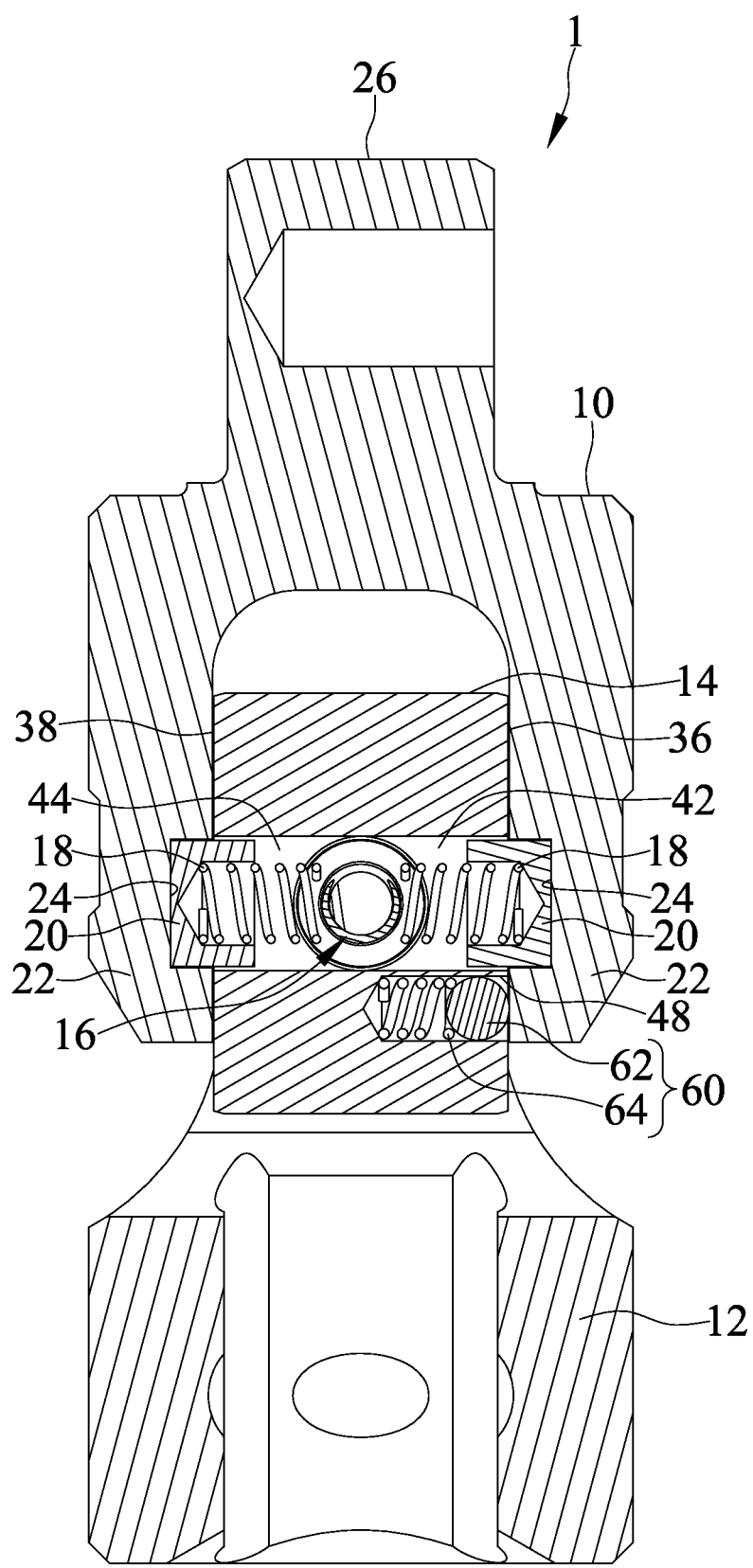
FIGS. 5 and 6 are sectional views of the preferred embodiment of the present invention, and illustrates two positioning units abutting against an interior side of one of the first lugs and an interior side of one of the second lugs.
Figure 6:
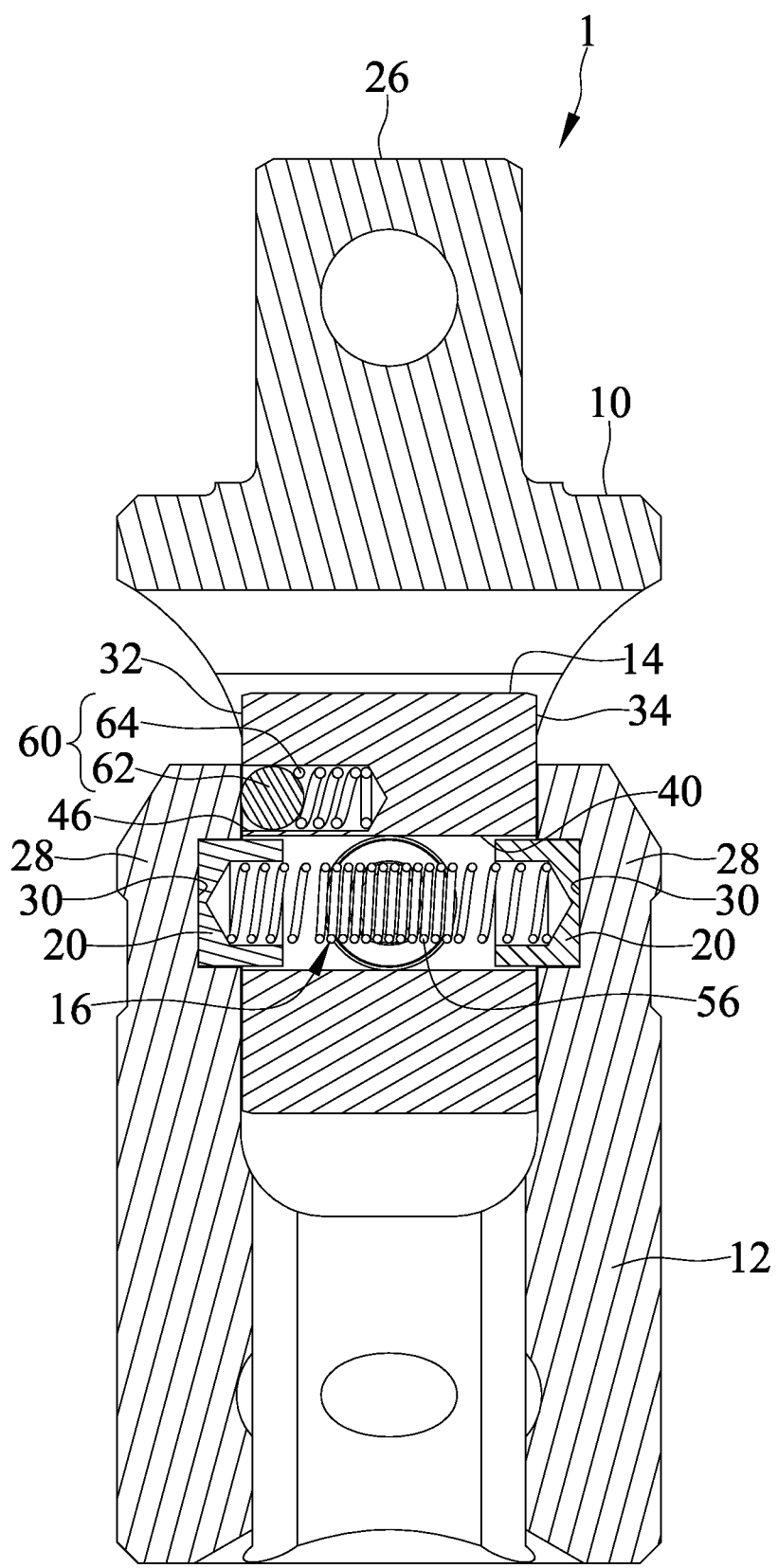

As shown in FIGS. 5 and 6, the two positioning units 60 are received in the fourth bore 46 and the fifth bore 48 and abut against an interior side of one of the first lugs 22 and an interior side of one of the second lugs 28 to provide a positioning function to maintain the inclined angle while the first base 10 and the second base 12 are pivoted each other. Further, each positioning unit 60 includes a positioning member 62 and a biasing member 64 biasing against the positioning member 62 to abut against the interior side of one of the first lugs 22 and the interior side of one of the second lugs 28.

The first base 10 engages the second base 12 with the first lugs 22 between the second lugs 28. The jointer 14 is received in a space within the first and the second lugs 22 and 28. The short pins 20 are received in the recesses 24 and 30 of the first and the second lugs 22 and 28, respectively, and the first and the second elastic members 16 and 18 have ends urging the short pins 20, respectively to make them abut against the first lugs 22 and the second lugs 28, respectively. Besides, each of the short pins 20 has a portion received in the first or the second or the third bore 40 or 42 or 44 and a portion received in the recess 24 or 30. As a result, the first base 10 is able to be rotated related to the second base 12 in all directions.

To compare with the prior arts, only three elastic members 16, 18 are provided in the first preferred embodiment, and the jointer 14 is drilled with three bores 40, 42, 44. It may reduce the cost and time to manufacture the elastic short-pin type universal joint 1 of the first preferred embodiment.

It must be pointed out that the embodiments described above are only some preferred embodiments of the present invention. All equivalent structures which employ the concepts disclosed in this specification and the appended claims should fall within the scope of the present invention.

The invention claimed is:

1. An elastic short-pin type universal joint comprising:
    a first base having two first lugs;
    a second base having two second lugs, wherein the first base engages the second base with the first lugs between the second lugs, wherein each of the two first lugs and the two second lugs has a recess on an interior side thereof, wherein each recess of each first lug does not penetrate through an exterior side of each first lug, and wherein each recess of each second lug does not penetrate through an exterior side of each second lug;
    a jointer having a first bore, a second bore, a third bore, a fourth bore, and a fifth bore; the first bore passing through the jointer, the second bore and the third bore being at opposite sides of the first bore, the fourth bore extending parallel to the first bore, and the fifth bore extending parallel to the second bore, wherein the jointer is received in a space within the first lugs of the first base and the second lugs of the second base;
    a first elastic member received in the first bore of the jointer, wherein the first elastic member has a first portion and a second portion; a number of loops per unit length of the first portion is greater than the second portion of the first elastic member;
    two second elastic members received in the second bore and the third bore, respectively, and the two second elastic members abut against the first portion of the first elastic member;
    four short pins, each short pin received in a respective recess, two of which are urged by opposite ends of the first elastic member and the other two of which are urged by the second elastic members, whereby the short pins abut against the first lugs of the first base and the second lugs of the second base by the first elastic member and the second elastic members ; and
    two positioning units received in the fourth bore and the fifth bore, respectively, and abutting against an interior side of one of the first lugs and an interior side of one of the second lugs, respectively.

2. The elastic short-pin type universal joint of claim 1, wherein each positioning unit includes a positioning member and a biasing member biasing against the positioning member to abut against the interior side of one of the first lugs and the interior side of one of the second lugs.

3. The elastic short-pin type universal joint of claim 1, wherein the second bore and the third bore are communicated with the first bore, and the second elastic members abut against the first elastic member.

4. The elastic short-pin type universal joint of claim 1, wherein a density of the first portion is greater than the second portion of the first elastic member.

* * * * *